United States Patent [19]

Bennett et al.

[11] Patent Number: 5,446,577

[45] Date of Patent: Aug. 29, 1995

[54] ELECTRODE FOR DISPLAY DEVICES

[75] Inventors: Russell N. Bennett, Catonsville; William E. Kokonaski; Michael J. Hannan, both of Columbia; Larry G. Boxall, Catonsville, all of Md.

[73] Assignee: Martin Marietta Corporation, Bethesda, Md.

[21] Appl. No.: 332,613

[22] Filed: Oct. 31, 1994

Related U.S. Application Data

[63] Continuation of Ser. No. 504, Jan. 5, 1993, abandoned.

[51] Int. Cl.$^6$ .............................................. G02F 1/153
[52] U.S. Cl. .................................. 359/273; 359/267; 359/269
[58] Field of Search ............... 359/265, 267, 268, 269, 359/271, 273, 274

[56] References Cited

U.S. PATENT DOCUMENTS

| | | | |
|---|---|---|---|
| 3,844,636 | 10/1974 | Maricle et al. | 359/267 |
| 3,879,108 | 4/1975 | Berets | 350/160 R |
| 4,006,966 | 2/1977 | Meyers et al. | 350/160 R |
| 4,009,936 | 3/1977 | Kasai | 350/160 R |
| 4,135,790 | 1/1970 | Takahashi et al. | 350/357 |
| 4,167,308 | 9/1979 | Barclay et al. | 350/357 |
| 4,167,309 | 9/1979 | Barclay et al. | 350/357 |
| 4,233,339 | 11/1980 | Leibowitz et al. | 427/108 |
| 4,256,380 | 3/1981 | Barclay et al. | 350/357 |
| 4,258,984 | 3/1981 | Beni et al. | 350/357 |
| 4,294,518 | 10/1981 | O'Connor et al. | 350/357 |
| 4,416,517 | 11/1983 | Beall et al. | 359/285 |
| 4,448,493 | 5/1984 | Matsudaira et al. | 350/357 |
| 4,459,035 | 7/1984 | Nanya et al. | 368/241 |
| 4,465,339 | 8/1984 | Baucke et al. | 359/267 |
| 4,550,982 | 11/1985 | Hirai | 350/357 |
| 4,749,260 | 6/1988 | Yang et al. | 350/357 |
| 4,768,865 | 10/1988 | Greenboro et al. | 350/357 |
| 4,887,890 | 12/1989 | Scherber et al. | 350/357 |
| 4,892,394 | 1/1990 | Bidabad | 350/357 |
| 4,960,324 | 10/1990 | Brown | 350/357 |
| 4,993,810 | 2/1991 | Demiryont | 350/357 |

FOREIGN PATENT DOCUMENTS

| | | |
|---|---|---|
| 0035766 | 9/1981 | Germany . |
| 0272428 | 6/1988 | Germany . |
| 109317 | 8/1981 | Japan . |
| WO9218896 | 10/1992 | WIPO . |

OTHER PUBLICATIONS

IBM Technical Disclosure Bulletin vol. 19, No. 10, Mar. 1977, New York, p. 3879.

C. M. Lampert and C. G. Granqvist, "Introduction to Chromogenics", Large-Area Chromogenics: Materials and Devices for Transmittance Control, SPIE Institute Series vol. IS 4, pp. 2-19 (1990).

Kuo-Chuan Ho, David E. Singleton & Charles B. Greenberg: "Effect of Cell Size on the Performance of Electrochromic Windows," Proceedings of the Symposium on Electrochromic Materials, Proceedings—The Electrochemical Society, vol. 90, No. 2 pp. 349-364 (1989).

*Primary Examiner*—Scott J. Sugarman
*Assistant Examiner*—Thomas Robbins
*Attorney, Agent, or Firm*—Gay Chin; Brian J. Rees; Alan G. Towner

[57] ABSTRACT

Display devices incorporating an improved working electrode are disclosed. The devices comprise a transparent outer layer, a first electrode having a reflective surface facing the transparent layer, an electrochromic material located between the reflective surface and the outer transparent layer, an electrolyte in contact with the electrochromic material and a second electrode located behind the first electrode. The first electrode is ion-permeable, allowing ions to pass through and contact the electrochromic material in order to alter the optical properties of the material. The electrochromic material is preferably a conductive polymer such, as polyaniline. The display devices are capable of changing reflectance and/or color by the application of an electric potential to the electrodes.

20 Claims, 4 Drawing Sheets

ELECTRODE FOR DISPLAY DEVICES

This application is a continuation application Ser. No. 08/000,504, filed Jan. 5, 1993 now abandoned.

FIELD OF THE INVENTION

The present invention relates to display devices incorporating an improved electrode. More particularly, the invention relates to an improved working electrode for use in display devices which provides favorable optical and electrical characteristics, along with simplified fabrication. The devices are particularly suitable for large surface area applications.

BACKGROUND OF THE INVENTION

In the past, cathode ray tubes (CRT's) have dominated the electronic display market. Recently, efforts have been made to develop flat-panel display technologies, including electroluminescent, gas plasma and liquid crystal displays.

Numerous processes are known for the modulation of visible light. Among these processes, electrochromic techniques use the reversible change of color and/or optical density obtained by an electrochemical redox reaction of an electrochromic material in which the oxidized form and reduced form are of different colors, different indexes of refraction and/or different optical densities. Electrochromic materials change their optical properties due to the action of an electric field and can be changed back to the original state by a field reversal. In most electrochromic materials, the mechanism underlying the optical change is the insertion of ions into the electrochromic material and the subsequent extraction of the ions. The devices can show open circuit memory, i.e., voltage has to applied only when the optical properties are to be altered. Most electrochromic devices require an ion-containing material (electrolyte) in proximity with the electrochromic layer as well as transparent layers for setting up a distributed electric potential.

Recently it has become evident that electrochromism occurs in numerous transition metal oxides and organic materials [See C. M. Lampert and C. G. Granquist, "Introduction to Chromogenics", *Large-Area Chromogenics: Materials and Devices for Transmittance Control,* SPIE Institute Series Vol. IS 4, pp 2-19 (1990)]. Specific prior art electrochromic materials include metal oxides such as $WO_3$, $MO_3$, $V_2O_5$, $Ir_2O_3$ and $Nb_2O_5$, polymers such as polyaniline, polyacetylene, polypyrrole and polythiophene, and aqueous solutions of metal ions such as Zn.

Many applications exist for electrochromic materials, including display panels, variable transmittance windows and variable reflectance mirrors. The development of flat displays and the like has been hampered by the need for transparent, electrically conductive windows. Conventionally, thin layers of metals or semiconductor oxides have been deposited on a transparent substrate such as glass to form a substantially transparent electrode. However, such designs suffer from several drawbacks. For example, in the case of conductive metal layers, optical loss is inherent and increased transmittance can only be attained by using thinner films. Such thin films, however, possess increased electrical sheet resistance and decreased current handling capacity, resulting in slower switching speeds of the displays. In addition, metal layers may undergo deleterious reactions with electrochromic materials during operation. Transparent semiconductor oxide layers also suffer from drawbacks such as relatively high electrical resistivity, limited current handling capacity and brittleness. Furthermore, the preparation of such oxide layers is relatively complex, requiring the use of elaborate fabrication techniques such as chemical vapor deposition.

U.S. Pat. No. 4,009,936 issued Mar. 1, 1977 to Kasai discloses electrochromic display devices including a solid electrochromic material and a solid electrolyte. The electrochromic material is selected from tungsten oxide, molybdenum oxide, titanium oxide, vanadium oxide, cobalt tungstate, tin oxide, tellurium oxide, iron oxide, rare earth oxides, metal halides, strontium titanate, metal carbonyls, salicylidene aniline, and organic materials containing a hydrazone group, an osazone group, a semicarbazone group or a sydnone group. The electrolyte is selected from $Ag_7I_4PO_4$, $AgI$, and $AgI$ in combination with a member of the $Ag_4P_2O_7$ series, the $Ag_2WO_4$ series, the $RbI$ series, the $NH_4I$ series, the $KCN$ series, or the $C_4H_8SCH_3I$ series. The display devices also include a transparent electrode in contact with the electrochromic material comprising a conductive film of unspecified composition coated on a glass substrate. The devices are said to be useful for display purposes, e.g., timepieces and the like.

U.S. Pat. No. 4,448,493 issued May 15, 1984 to Matsudaira et al discloses electrochromic display devices including an electrochromic layer and a solid proton conductive layer. The electrochromic layer consists of a transition metal oxide such as $WO_3$, $MoO_3$, $TiO_2$, $Ir_2O_3$, $Rh_2O_3$, $NiO$ or $V_2O_5$. The proton conductive layer comprises a mixture of acids selected from titanic, stannic, antimonic, zirconic, niobic, tantalic and silicic acid. The display devices also include a transparent electrode contacting the electrochromic material and comprising a thin film of indium oxide ($In_2O_3$) or tin oxide ($SnO_2$) deposited on a transparent substrate such as glass or synthetic resin. The disclosed devices are said to possess shortened response times, with speeds on the order of 1 to 10 seconds being emplemplary.

U.S. Pat. No. 4,459,035 issued Jul. 10, 1984 to Nanya et al discloses electrochromic display devices including a reduction electrochromic material and an oxidation electrochromic material separated by an ion permeable insulating layer. The reduction electrochromic material is $WO_3$ or $MoO_3$, while the oxidation electrochromic material is iridium hydroxide $[Ir(OH)_n]$, rhodium hydroxide $[Rh(OH)_n]$ or nickel hydroxide $[Ni(OH)_n]$. As the ion permeable insulator, $Ta_2O_5$, $Cr_2O_3$ or $SiO_2$ may be used. The display devices also include a transparent electrode contacting the reduction electrochromic material and a counter electrode contacting the oxidation electrochromic material. During operation of the device, the oxidation electrochromic material is said to function as an acceptor of protons, thereby preventing evolution of hydrogen gas on the surface of the counter electrode. The devices may be used as display panels for electronic timepieces.

U.S. Pat. No. 4,233,339 issued Nov. 11, 1980 to Leibowitz et al discloses electrochromic display devices including an electrochromic material and an electrolyte. The electrochromic material may comprise $WO_3$ which has been partially converted from the amorphous to the crystalline form which is said to significantly increase the etch resistance of the material, thereby increasing the useful life of the device. The electrolyte may be liquid, gel, paste or solid. The display devices also include a transparent electrode in contact with the electrochromic material comprising a conductive layer, such as tin oxide, deposited on a transparent glass or plastic substrate.

Japanese Patent no. 56-109317 to Nagasawa et al, published Aug. 29, 1981, discloses electrochromic display devices having a layer of amorphous $WO_3$ and a layer of crystalline $WO_3$ separated from each other by an ion conductive layer such as SiO, $Al_2O_3$, $ZrO_2$, $MgF_2$ or $CaF_2$. The devices also include a transparent electrode in contact with each of the $WO_3$ layers comprising tin oxide, indium oxide or indium tin oxide (ITO). The crystalline $WO_3$ is said to maintain a coulomb balance within the devices and to produce long life and high reliability.

U.S. Pat. No. 4,135,790 issued Jan. 23, 1979 to Takahashi et al discloses electrochromic elements comprising a thin layer of electrochromic material and a thin layer of electron blocking material sandwiched between a pair of transparent electrodes to form a unit cell. Multiple unit cells are stacked together to form a multi-layer structure. The electrochromic material may be $WO_3$ or $MoO_3$. The use of multiple thin layers of electrochromic material is said to reduce the response times of the devices.

U.S. Pat. No. 4,768,865 issued Sep. 6, 1988 to Greenberg et al discloses transparent electrochromic windows using $WO_3$ as the electrochromic material along with a layer of ion conductive material. A counter electrode in the form of a metal grid is placed in contact with the ion conductive material. The metal grid participates in a balancing half-cell reaction whereby the metal grid is oxidized or reduced in response to the electrochromic transition of the $WO_3$. Use of the metal grid is said to allow operation of the device at lower potentials which prevents electrolysis of water and concurrent gas evolution. The devices have a response time on the order of two minutes. Similar devices are disclosed by Kuo-Chuan Ho, David E. Singleton and Charles B. Greenberg in an article: "Effect of Cell Size on the Performance of Electrochromic Windows," *Proceedings of the Symposium on Electrochromic Materials,* Proceedings—The Electrochemical Society, vol. 90, No. 2, pp. 349–364 (1989).

U.S. Pat. No. 4,887,890 issued Dec. 19, 1989 to Scherber et al discloses transparent electrochromic panes or foils including an electrochromic polymer layer and an electrolyte layer sandwiched between two transparent electrodes. Suitable polymers include polyaniline, poly-O-phenyldiamine, polyaniline-3-sulfanic acid, polypyrrole and polythiophene, while suitable electrolytes include polymeric sulfonic acid, polymeric carbonic acid, buffered $H_2SO_4$, buffered $HClO_4$ and HCl. Suitable transparent electrodes include $In_2O_3/SnO_2$ (ITO), $SnO_2$, $In_2O_3$, Mo, Pd, Pt, Rh, Ti and ZnSe which may be coated on a glass pane or foil. The devices are said to have response times on the order of a few seconds.

U.S. Pat. No. 4,749,260 issued Jun. 7, 1988 to Yang et al discloses transparent electrochromic display devices including a layer of polyaniline electrochromic material and a layer of electrolyte material disposed between two transparent electrodes. The electrodes comprise a transparent conductive coating such as $SnO_2$, $In_2O_3$, Pt or Au deposited on a glass or plastic sheet. The devices may employ multiple layers of electrochromic materials to produce tint and color changes.

U.S. Pat. No. 4,550,982 issued Nov. 5, 1985 to Hirai discloses electrochromic display devices including a layer of electrochromic material and a layer of electrolyte material disposed between two transparent electrodes. The electrochromic material consists of a polymer film comprising at least one organic electrochromic material and at least one ionic material wherein the ionic material is capable of exchanging ions with the organic electrochromic material to serve as an ion donor or acceptor. Suitable electrodes include $SnO_2$ or ITO coated on a glass or plastic plate. The devices possess a response time on the order of 0.5 to 6 seconds.

PCT published Patent Application No. WO 92/18896, which is hereby incorporated by reference, discloses an improved working electrode for display devices comprising a metal grid along with a metal oxide coating. The preferred electrochromic material comprises an aqueous solution of an electrochemically depositable metal. During operation, the metal is deposited on the working electrode to change the optical properties of the device.

The devices noted above require the use of electrodes comprising substantially transparent, electrically conductive coatings that must possess satisfactory optical properties while at the same time possessing sufficient electrical conductivity. These are competing requirements that result in less than optimal optical and/or electrical properties due to the need to maximize the combination of these properties. The present invention has been developed in view of the foregoing and to overcome other deficiencies of the prior art.

SUMMARY OF THE INVENTION

An object of the present invention is to provide a new electrode for use in display devices and the like.

Another object of the present invention is to provide an improved display device including a center electrode that eliminates the need for a transparent and electrically conductive front electrode layer.

Another object of the present invention is to provide an improved display device comprising a conductive polymer electrochromic material that changes optical properties upon the insertion or extraction of ions from the material.

DETAILED DESCRIPTION OF THE PREFERRED EMBODIMENTS

In accordance with the present invention, a display device is provided comprising a substantially transparent outer layer, a first electrode comprising a reflective surface facing the transparent layer, an electrochromic material disposed between the reflective surface and the outer transparent layer, an electrolyte in contact with the electrochromic material and a second electrode located further away from the transparent outer layer than the first electrode. The first or working electrode includes means, such as holes or slits, for allowing ions to pass through the electrode and to contact the electrochromic material in order to alter the optical properties thereof. As discussed further below, the working electrode of the present invention avoids the problems associated with prior art electrodes that require both optical transparency and good electrical conductivity. The term "optical properties" as used in the present invention is defined broadly to include properties in the visible, infrared (IR) and other regions of the electromagnetic spectrum.

Figure 1:
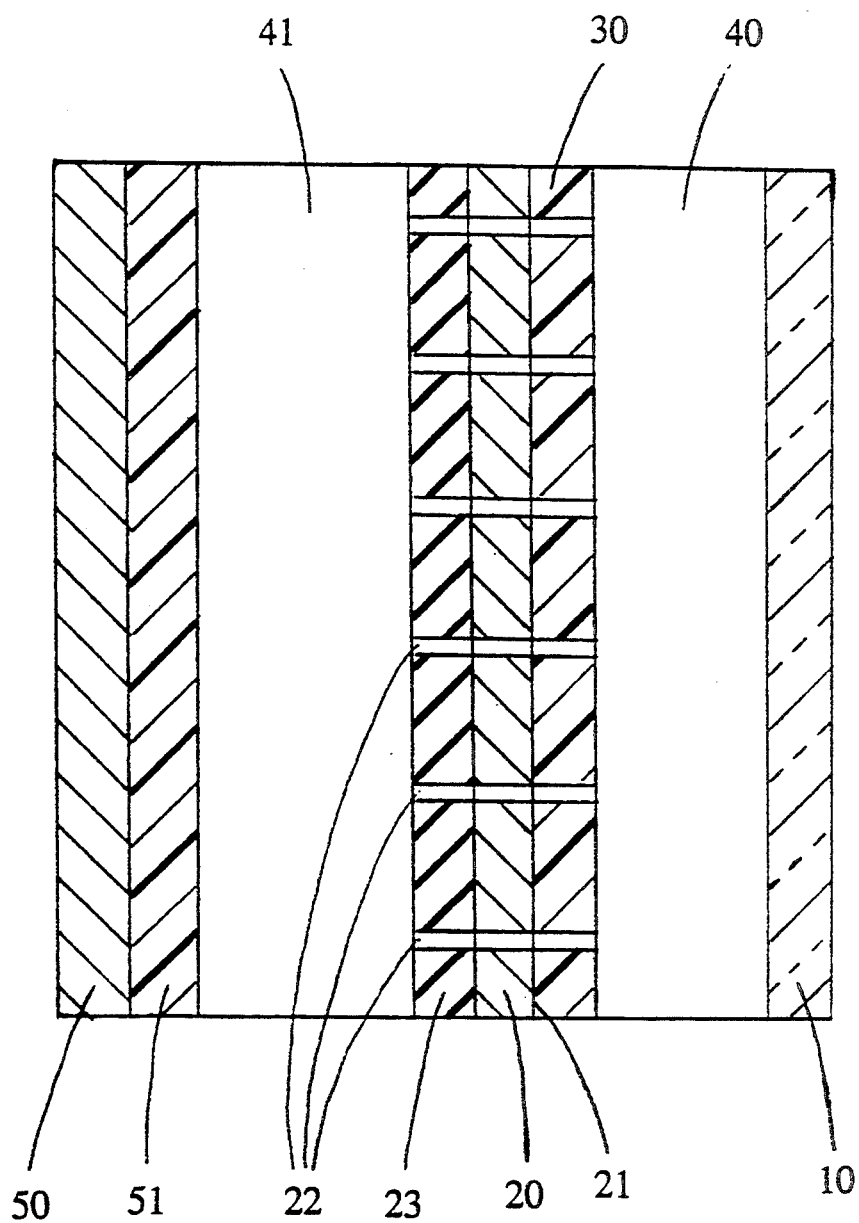
FIG. 1 is a schematic side view of a display device in accordance with one embodiment of the present invention.

Referring to the drawings in detail, FIG. 1 shows a schematic side view of a display device in accordance with one embodiment of the present invention. A transparent outer layer 10 is located at the viewing side of the device. A first electrode 20 is located interior to the transparent outer layer 10 and includes a reflective surface 21 facing the transparent outer layer. The electrode 20 is electrically conductive and includes means 22 for allowing ions to pass through the electrode, such as holes or slits. The electrode 20 also includes a non-electrically conductive layer 23 that is ion permeable. An electrochromic material 30 is disposed between the reflective surface 21 of the first electrode and the transparent outer layer 10. The electrochromic material 30 includes means 22 for allowing ions to pass therethrough, such as holes or slits. An electrolyte 40 is disposed between the electrochromic material 30 and the transparent outer layer 10. An electrolyte 41 is disposed on the opposite side of the first electrode 20. A second electrode 50 is disposed at a greater distance from the outer layer 10 than the first electrode 20. An optional layer of material 51 may be disposed on the second electrode 50 and may serve as a source of ions. In the preferred embodiment, the layer 51 may be an electrochromic material of the same composition as that of the electrochromic material 30. Electrical connections (not shown) are made to the first electrode 20 and the second electrode 50 in a conventional manner. Although not shown in FIG. 1, a sealant is used around the edges of the device in order to contain the electrolytes 40 and 41.

Figure 2:
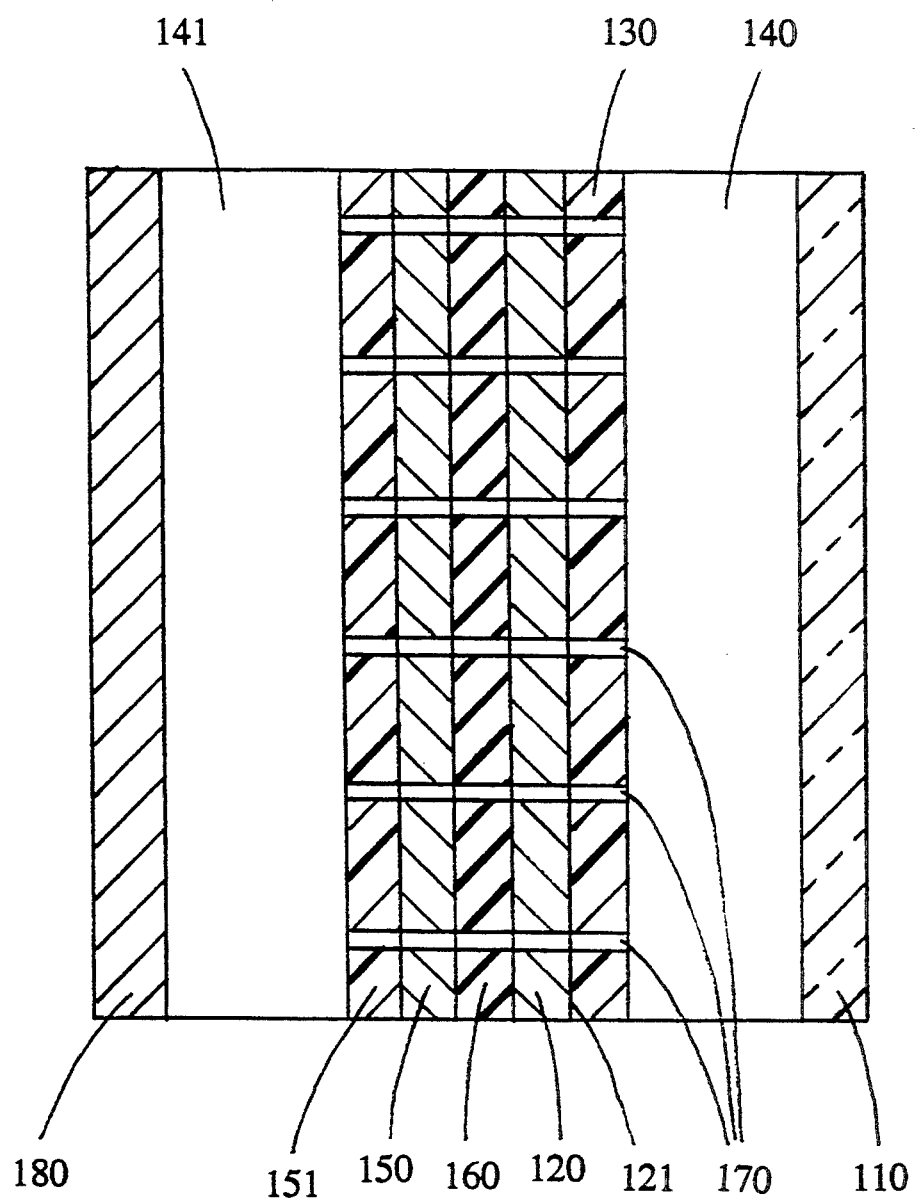
FIG. 2 is a schematic side view of a display device in accordance with another embodiment of the present invention.

FIG. 2 is a schematic side view of a display device in accordance with another embodiment of the present invention. A transparent outer layer 110 is located at one outer surface of the device. A first electrode 120 is disposed interior to the outer transparent layer 110 and has a reflective surface 121 facing the outer transparent layer. An electrochromic material 130 is disposed on the reflective surface 121 of the first electrode 120. A second electrode 150 is located at a greater distance from the outer transparent layer 110 than the first electrode 120. Disposed on the second electrode 150 is a layer of material 151 that acts as an ion source and which is preferably of the same composition as the electrochromic material 130. An electrical insulating layer 160 is disposed between the first electrode 120 and the second electrode 150. An electrolyte 140 is disposed between the outer transparent layer 110 and the electrochromic material 130, while an electrolyte 141 is disposed against the ion source layer 151 of the second electrode 150. Means 170 are provided for allowing ions to pass through the first electrode 120, the second electrode 150 and the insulating layer 160, permitting the ions to contact the electrochromic layer 130 and ion source 151. The outer layer 180 may be opaque or transparent, depending on whether one-sided or two-sided operation is desired. Electrical contacts (not shown) may be made in a conventional manner to electrodes 120 and 150. A sealant (not shown) may be provided around the edges of the device in order to provide containment.

In accordance with the present invention, the transparent outer layer or front window may be made of any material having satisfactory transparency in the desired spectral region. In visual displays, a transmittance of greater than 50% is typically desired, with a transmittance of greater than 75% being preferred. A transmittance of greater than 90% is most preferred. Glass and plastic are suitable transparent layers, with plastic being most preferred due to its durability and flexibility. Suitable plastics include polyethylene, polytetrafluoroethylene, polyester, polyethylene terephthalate and other commercially available materials. Soda glass, borosilicate glass, ZnS and ZnSe are also suitable transparent outer layers. Since the transparent outer layer does not act as a working electrode, there is no need to apply a conductive coating to this layer. This is a major advantage because in prior art display devices a coating is applied to the front transparent surface and must serve as an electrical conductor while also being substantially transparent.

The first or working electrode of the present invention is not located on the front transparent surface as in conventional display devices. Instead, the first electrode is set back from the front surface and an electrochromic material is disposed between the electrode and the front surface as shown in FIGS. 1 and 2. In addition to being electrically conductive, the first electrode must include a reflective surface facing the front surface of the device. The reflective surface preferably comprises a metal such as gold, silver, aluminum, platinum, rhodium, iridium, or any other metal that meets the chemical stability and reflectance requirements of the device. A preferred first electrode comprises a plastic substrate with a metalized surface layer that provides both electrical conductivity and the desired reflectance characteristics.

One type of metallized surface layer is a woven or nonwoven fabric metallized with Cu, Ni, Sn and other metals, or combinations thereof. Suitable fabrics include acrylic, polyester, nylon, graphite and aramid fabrics. Such metallized fabrics may possess visible and/or IR reflectivities of from about 30 to 90 percent and are commercially available from the Monsanto Company under the name FLECTRON METALLIZED MATERIALS. Metallized fabrics such as these possess the advantage that they are both reflective and ion permeable.

The electrochromic material used in accordance with the present invention changes optical properties based upon the insertion or extraction of ions therefrom. Several types of such eLectrochromic materials are known, including metal oxides and electrically conductive polymers. Exemplary of the metal oxides are $WO_3$ and $MO_3$, while conductive polymers include polyaniline, polyacetylene, polypyrrole, polythiophene, polyphenylene, polyphenylene vinylene, polyphenylene sulfide, polyphenyldiamine, poly (N,N'diphenyl benzidine) and derivatives, copolymers and bilayers thereof. Conductive polymers such as polyaniline, polypyrrole and poly (diphenyl amine) are preferred due to their optical switching characteristics and their mechanical properties such as flexibility and durability. When conductive polymer films are used, a single layer or multiple layers may be employed.

The electrolyte used in accordance with the present invention must be chemically compatible with the electrochromic material and may be aqueous or organic based, or solid. The electrolyte should preferably absorb a minimal amount of radiation in the desired spectral region. Examples of aqueous electrolytes include aqueous solutions containing disolved salts and/or polymers, e.g., polyvinyl alcohol. Examples of organic electrolytes include organic liquids such as polyethylene carbonate and propylene carbonate. Solid electrolytes may comprise poly (ethylene oxide) and poly (vinyl alcohol).

The second or counter electrode may be any suitable electrically conductive material. If a metal is used, it may be in direct contact with the electrolyte, in which case the metal may serve as an ion source. The metal may be provided in the form of a relatively thick sheet sufficient to provide structural support for the device. Alternatively, the metal may be provided as a thin coating on a substrate such as a plastic sheet. In the preferred embodiment, the second electrode includes a layer of electrochromic material of the same composition as that used on the first electrode. In the embodiment shown in FIG. 1, the second electrode is separated from the first electrode by a layer of electrolyte material. In contrast, in the embodiment shown in FIG. 2, the second electrode is separated from the first electrode by an insulating layer such as plastic. Suitable plastics include polyester, polyetheresterketone (PEEK), KAPTON polypyromelitimide, TEFLON polytetrafluoroethylene, polyethylene and MYLAR polyethylene terphthalate. The second electrode of the present invention may be opaque. However, in devices such as shown in FIG. 1 in which two sided operation is desired, the second electrode may be substantially transparent. In such a case, an electrically conductive transparent coating may be used, such as a semiconductor metal oxide, a thin metal layer or a metallic grid. Suitable semiconductor oxides include tin oxide, indium oxide and indium tin oxide (ITO). Suitable metals include gold, copper and platinum. A particularly preferred electrically conductive, transparent coating for use as an electrode comprises a metal grid having an ITO coating as disclosed in PCT Application No. WO 92/18896.

An optional barrier layer or semi-permeable membrane may be placed between the first working electrode and the second counter electrode to prevent unwanted contamination, such as heavy metals, from reaching the first electrode. When a liquid electrolyte is used, the barrier layer may be porous filter paper or any other material that prevents unwanted contamination by deleterious ingredients, while still allowing the desired ion movement.

A seal is disposed around the edges of the present display devices in order to contain the electolyte. The seal may comprise an adhesive, such as epoxy, and is selected such that it has a sufficiently low permeability to water or organic solvents to prevent unwanted drying of the electrolyte. Where a polymeric outer transparent layer is used, care should be taken that the polymer has low water or organic solvent permeability. Sealants may be applied to the transparent layer in order to prevent drying, provided that the sealant layer is substantially transparent.

While display devices comprising two electrodes are shown in FIGS. 1 and 2, it is recognized that a double-sided or two-sided device is possible comprising two exterior working electrodes having reflective surfaces facing opposite transparent outer layers and a third counter electrode in the interior of the device. Such a device would include a transparent outer layer similar to that shown in FIG. 1 and a second transparent outer layer at the opposite side of the device. An additional working electrode would be included having a reflective surface facing the additional transparent layer. An electrochromic material would be disposed on the reflective surface of the additional electrode in order to provide optical switching on the rear surface of the device. The additional electrode and electrochromic material would preferably be of the same construction as the first electrode and electrochromic material.

A novel feature of the present invention is the use of a first electrode having a reflective surface that is permeable to the flow of ions. Means such as holes or slots are provided through the first electrode layer for allowing ion movement between the electrochromic material disposed on the front surface of the electrode and the counter electrode located behind the first electrode. Unlike conventional display devices in which the working electrode and counter electrode face each other, the working electrode of the present invention does not face the counter electrode, i.e., there is a resistive layer between the two electrodes. By using an ion-permeable electrode, the present display device avoids the need for electrically conductive, transparent coatings on the front transparent surface of the device. Holes, slots or slits formed in the first electrode are suitable and may be formed by methods such as cutting, drilling, punching, laser, electron discharge milling and chemical etching. In addition, smaller holes may be formed through the first electrode by methods such as nuclear particle bombardment and ion milling. As noted previously, the first electrode may comprise a metallized woven or nonwoven fabric, in which case ion permeability is provided through the spaces between the fibers of the fabric. In addition to plastic layers that have been cut, drilled, punched, etc. to provide ion permeability, other types of materials may be used as the electrical insulating layer of the first electrode. For example, porous layers of sintered alumina or other filter membranes may be used. Since the first electrode must be permeable to ions (hydrogen ions, metal ions, halogen ions, and the like), the perforations in the first electrode do not have to be large. In order to maintain sufficient reflectivity, the thruholes located in the reflective surface should typically comprise less than about 50% and more preferably less than about 10% of the reflective surface area. More preferably, the thruholes should comprise less than about 1% of the reflective surface area. Thus, the thruholes must be large enough to permit ions to pass through but must not-be so large as to substantially interfere with the reflective qualities of the electrode surface. The term "thruhole" as used in accordance with the present invention is defined broadly to include means such as holes, permeable fabrics and other porous media that allow ion movement therethrough.

The devices of the present invention operate in the following manner. Referring to FIG. 1, when the electrochromic material 30 is in the non-absorptive or bleached state, light entering from the right side through the transparent outer layer 10 is reflected off of surface 21 and back out through the transparent layer 10. Since the electrolyte 40 is also substantially non-absorptive, the magnitude of the light reflected from the device approaches the magnitude of light entering the device. A large degree of the reflectance is therefore achieved. In the case of a typical electrochromic material comprising a conductive polymer, the material is non-absorptive or bleached when a negative potential is applied to the first electrode 20. In this state, ions pass from the ion source layer 51 through holes 22 and into the electrochromic material 30 via the electrolyte 41 and 42. Depending on the type of electrochromic material used, suitable ions include hydrogen, metal and halogen ions. When the device is switched and a positive potential is applied to the first electrode 20, ions are extracted from the electrochromic material 30 and pass through holes 22 back to the layer 51 via electrolyte 40 and 41. Upon the extraction of ions the electrochromic material 30 becomes more absorptive or darkens, thereby decreasing reflectance of the device. In addition, the color of the electrochromic material may change. Since the electrochromic material is now in the absorbing state, light passing from the right through the transparent outer layer 10 is absorbed by the electrochromic material 30, allowing less reflectance from the reflective surface 21. For certain electrochromic materials, changes in electrical conductivity produce accompanying changes in the material's index of refraction, which changes the degree of reflection from the electrochromic material/electrolyte interface. This may be particularly apparent in the IR region.

The operation of the device of FIG. 2 is similar to that of FIG. 1 with the exception that the ions have to be transported a shorter distance due to the fact that the second electrode 150 is separated by the first electrode 120 by a thin ion-permeable, insulating layer.

In the preferred embodiment of the present invention, the various layers of the display device are flexible, which allows the device to be conformed to curved surfaces. A conformal display device may therefore be provided in which the transparent outer layer and first and second electrode layers are made of flexible layers of plastic.

The following examples illustrate various aspects of the present invention and are not intended to limit the scope of the invention.

EXAMPLE 1

Figure 3:
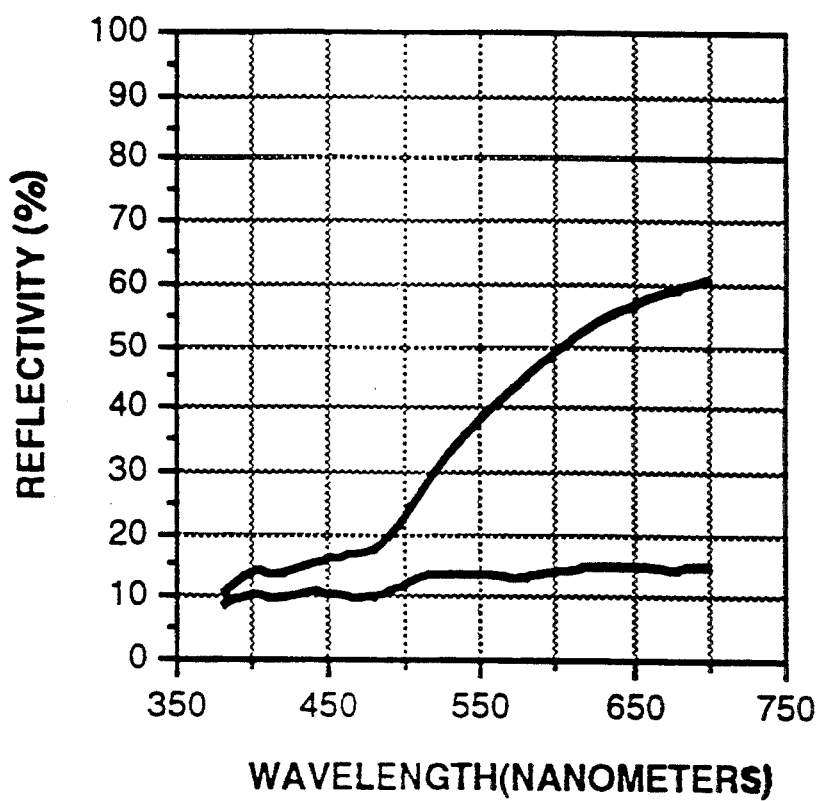
FIG. 3 is a graph showing change in reflectance of a device of the present invention.

A first electrode is formed by coating a 3 by 3 by 0.006 inch (76 by 76 by 0.15 mm) thick sheet of polyethylene with 350 Angstroms of gold to form a reflective surface. The reflective surface is then coated with a layer of polyaniline electrochromic material by exposing the surface for 8 minutes in an aniline plating solution comprising 92.20% distilled aniline, 4.47% distilled water, 2.35% sulphuric acid and 0.98% acrylic acid. A second electrode is formed by coating a 0.006 inch (0.15 mm) thick sheet of polyethylene with 350 Angstroms of gold. The gold layer is then coated with polyaniline by exposing the surface for 20 minutes in an aniline plating solution as described above. The first electrode is perforated by cutting slits through the electrode and polyaniline layer. The slits run parallel to each other and are approximately ⅛ inch (3.18 mm) apart. An electrolyte is formed comprising 75% water and 25% polyvinyl alcohol (PVA) with buffered HCl solution added to attain a pH of 1.5. The buffered HCl is added to the water prior to the addition of the PVA. A transparent outer layer is provided in the form of a 0.007 inch (0.18 mm) thick sheet of polyester. The device is assembled by wetting the first electrode in the electrolyte and placing the aniline side against a slightly oversized piece of the transparent polyester outer layer. A sheet of filter paper is saturated with electrolyte and placed against the back of the first electrode. The second electrode is then placed against the saturated filter paper with the aniline facing the paper. Excess electrolyte is squeezed out of the sides of the device using a metal spatula. The sides of the device are then sealed with a chemically resistant tape or epoxy. Electrical connections are made to each of the first and second electrodes. The device is flexible and may be conformed to curved surfaces. A negative potential of 0.6 volt is applied to the first electrode, which causes bleaching of the polyaniline electrochromic layer and high reflectance of the device. The electric field is then switched and a 0.6 volt positive potential is applied to the first electrode. The polyaniline electrochromic layer darkens and the device becomes less reflective. FIG. 3 is a graph showing the change in reflectivity of the device. Switching speeds from dark to light are approximately one to two seconds, while switching speeds from light to dark are approximately two to four seconds. However, switching speed of the device would increase with more effective perforation of the first electrode. The lower reflectivity at the shorter wavelengths as shown in FIG. 3 is believed to result from the poor reflectivity of gold at these shorter wavelengths.

EXAMPLE 2

Figure 4:
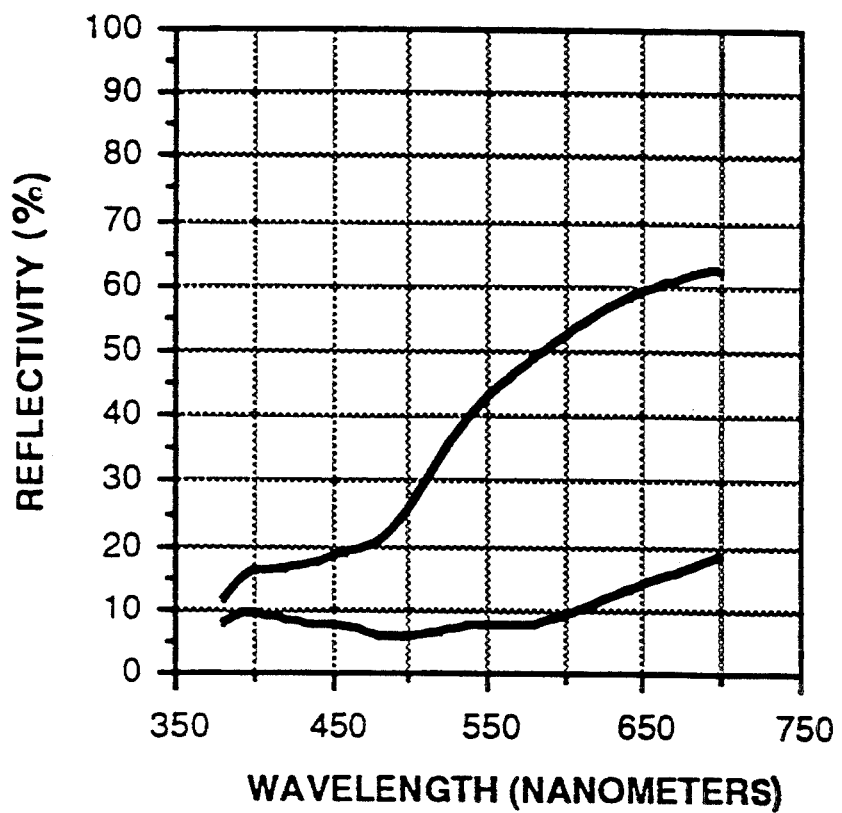
FIG. 4 is a graph showing change in reflectance of another device of the present invention.

Example 1 is repeated with the exception that the first electrode and polyaniline layer are perforated using a hot needle to form holes approximately 1/32 inch (0.79 mm) in diameter and ⅛ inch (3.18 mm) apart. FIG. 4 shows the high and low reflectances of this device. Switching speeds of the device are similar to those of Example 1.

EXAMPLE 3

Example 1 is repeated with the exception that the voltage applied to the first electrode is applied incrementally. When a varying negative potential ranging from 0 to 0.6 volt in increments of 0.1 volt is applied to the first electrode, the device changes from dark to light, with varying shades of gray evident as the negative voltage is increased. When the potential is switch and a varying positive potential ranging from 0 to 0.6 volt in increments of 0.1 volt is applied to the first electrode, the device changes from light to dark, with varying shades of gray apparent as the positive voltage is increased.

EXAMPLE 4

Example 1 is repeated with the exception that multiple 3 inch by 3 inch (7.6 cm by 7.6 cm) devices are placed in 5 rows and 5 columns to form an array of devices covering a surface area of about 15 by 15 inches (38 by 38 cm). When the same negative voltage is applied to the first electrode of each device, the entire 15 by 15 inch (38 by 38 cm) surface becomes highly reflective. When the same positive voltage is applied to the first electrode of each device, the entire 15 by 15 inch (38 by 38 cm) surface exhibits low reflectivity.

It is understood that the above description of the present invention is susceptible to considerable modifications, changes and adaptations by those skilled in the art and that such modifications, changes and adaptations are intended to be considered within the scope of the present invention, which is set forth by the appended claims.

We claim:

1. A display device comprising:

a) a substantially transparent outer layer;
b) a first electrode located behind said outer layer, and comprising a reflective surface facing said outer layer and including means for allowing ions to pass through said first electrode;
c) an electrochromic material disposed between said reflective surface and said outer layer and adapted to change optical properties by the insertion or extraction of ions therefrom;
d) an electrolyte in contact with said electrochromic material and said first electrode; and
e) a second electrode located behind said outer layer, and at a greater distance from said outer layer than said first electrode;

wherein said display device is substantially flexible thereby allowing said device to conform to an irregular surface.

2. A display device according to claim 1, wherein said outer layer is a flexible plastic selected from the group consisting of polyethylene, polytetrafluoroethylene, polyester and polyethylene terephthalate.

3. A display device according to claim 1, wherein said first electrode comprises a flexible plastic substrate disposed against said reflective surface and having perforations therein.

4. A display device according to claim 1, wherein said first electrode comprises a flexible metallized fabric.

5. A display device according to claim 1, wherein said reflective surface allows for flexibility, and comprises a metal selected from the group consisting of Au, Ag, Al, Pt, Rh, and Ir.

6. A display device according to claim 1, wherein said means for allowing ions to pass through said first electrode comprises slits, holes or a combination thereof.

7. A display device according to claim 1, wherein said flexible electrochromic material comprises a conductive polymer.

8. A display device according to claim 7 wherein said conductive polymer is selected from the group consisting of polyaniline, polyacetylene, polypyrrole, polythiophene, polyphenylene, polyphenylene vinylene, polyphenylene sulfide, polyphenyldiamine, poly(N,N'diphenyl (benzidine)) and derivatives, copolymers and bilayers thereof.

9. A display device according to claim 1, wherein said electrolyte comprises polyvinyl alcohol, polyethylene carbonate or propylene carbonate.

10. A display device according to claim 1, wherein said second electrode comprises a flexible metal layer.

11. A display device according to claim 1, wherein said second electrode comprises a flexible layer of material that serves as an ion source.

12. A display device according to claim 11, wherein said layer of material is substantially the same composition as said electrochromic material.

13. A display device according to claim 1, wherein said second electrode is opaque.

14. A display device according to claim 1, wherein said second electrode is substantially transparent.

15. A display device according to claim 1, wherein said second electrode is disposed on one side of a perforated flexible plastic substrate and said first electrode is disposed on the other side of said perforated plastic substrate.

16. A display device according to claim 15, wherein said second electrode comprises a perforated metal layer having a layer of material disposed thereon that serves as an ion source and is of substantially the same composition as said electrohromic material.

17. A display device according to claim 1, wherein said display device further comprises a flexible barrier layer disposed between said first electrode and said second electrode to substantially prevent unwanted ions from contacting said first electrode.

18. A display device comprising:
a) a substantially transparent first outer layer:
b) a first electrode located behind said first outer layer, and comprising a reflective surface facing said first outer layer and including means for allowing ions to pass through said first electrode;
c) an electrochromic material disposed between said reflective surface and said first outer layer and adapted to change optical properties by the insertion or extraction of ions therefrom;
d) an electrolyte in contact with said electrochromic material;
e) a second electrode located behind said first outer layer, and at a greater distance from said first outer layer than said first electrode:
f) a second substantially transparent outer layer opposing said first outer layer and beyond said second electrode with respect to said first electrode; and
g) a third electrode located between said second outer layer and said second electrode;

wherein said display device is substantially flexible thereby allowing said device to conform to an irregular surface.

19. A display device according to claim 18, wherein said third electrode comprises a reflective surface, the surface facing said second outer layer, having means for allowing ions to pass therethrough and having an electrochromic material disposed thereon.

20. A display device according to claim 19, wherein said electrochromic material disposed on said reflective surface of said third electrode comprises a conductive polymer.

* * * * *

UNITED STATES PATENT AND TRADEMARK OFFICE
CERTIFICATE OF CORRECTION

PATENT NO. : 5,446,577
DATED : August 29, 1995
INVENTOR(S) : Russell N. Bennett et al It is certified that error appears in the above-indentified patent and that said Letters Patent is hereby corrected as shown below:

Title Page, Item 57, "ABSTRACT", line 12, after "such" delete the comma (,).
Column 1, line 36, after "to" insert --be--.
Column 6, line 53, "eLectrochromic" should read --electrochromic--.
Column 8, line 52, "not-be" should read --not be--.
Column 10, line 42, "switch" should read --switched--.
Column 12, line 17, "electrohromic" should read --electrochromic--;
line 24, "layer:" should read --layer;--;
line 37, "electrode:" should read --electrode;--.

Signed and Sealed this

Twelfth Day of March, 1996

Attest:

BRUCE LEHMAN

*Attesting Officer*     *Commissioner of Patents and Trademarks*